United States Patent
Kunz et al.

[11] Patent Number: 6,041,484
[45] Date of Patent: Mar. 28, 2000

[54] METHOD AND APPARATUS FOR DISPOSING OF A RADIOACTIVELY CONTAMINATED STEAM GENERATOR

[75] Inventors: Rainer Kunz, Nürnberg; Hermann Operschall, Lauf, both of Germany

[73] Assignee: Siemens Aktiengesellschaft, Munich, Germany

[21] Appl. No.: 09/074,433

[22] Filed: May 7, 1998

Related U.S. Application Data

[63] Continuation of application No. PCT/EP96/04694, Oct. 29, 1996.

[51] Int. Cl.[7] ............................................. B07B 13/00
[52] U.S. Cl. .................................... 29/403.1; 29/890.031
[58] Field of Search ........................ 29/890.031, 403.1, 29/403.2

[56] References Cited

U.S. PATENT DOCUMENTS

| | | | |
|---|---|---|---|
| 4,507,840 | 4/1985 | Steinert et al. | 29/403.2 |
| 5,276,965 | 1/1994 | Hahn et al. | 29/890.031 |
| 5,293,682 | 3/1994 | Hahn et al. | 29/890.031 |
| 5,781,603 | 7/1998 | Wivagg | 29/890.031 |

FOREIGN PATENT DOCUMENTS

| | | |
|---|---|---|
| 2596433 | 10/1987 | France . |
| 2630465 | 10/1989 | France . |
| 1461117 | 12/1969 | Germany . |
| 3727563 | 2/1989 | Germany . |
| 4411621 | 10/1995 | Germany . |

*Primary Examiner*—Irene Cuda
*Attorney, Agent, or Firm*—Herbert L. Lerner; Laurence A. Greenberg; Werner H. Stemer

[57] ABSTRACT

A method for disposing of a radioactively contaminated steam generator with a multiplicity of U-shaped heating tubes fixed in a tube plate, includes cutting off the heating tubes above the tube plate, cutting open the dome of the steam generator and gripping the heating tubes one after the other at the U-bend with force-locking measures. Once gripped, each heating tube is drawn through crushing rollers to achieve an initial reduction in size and to reduce a bend radius of the tube and is then passed into a press where it is pressed flat.

9 Claims, 9 Drawing Sheets

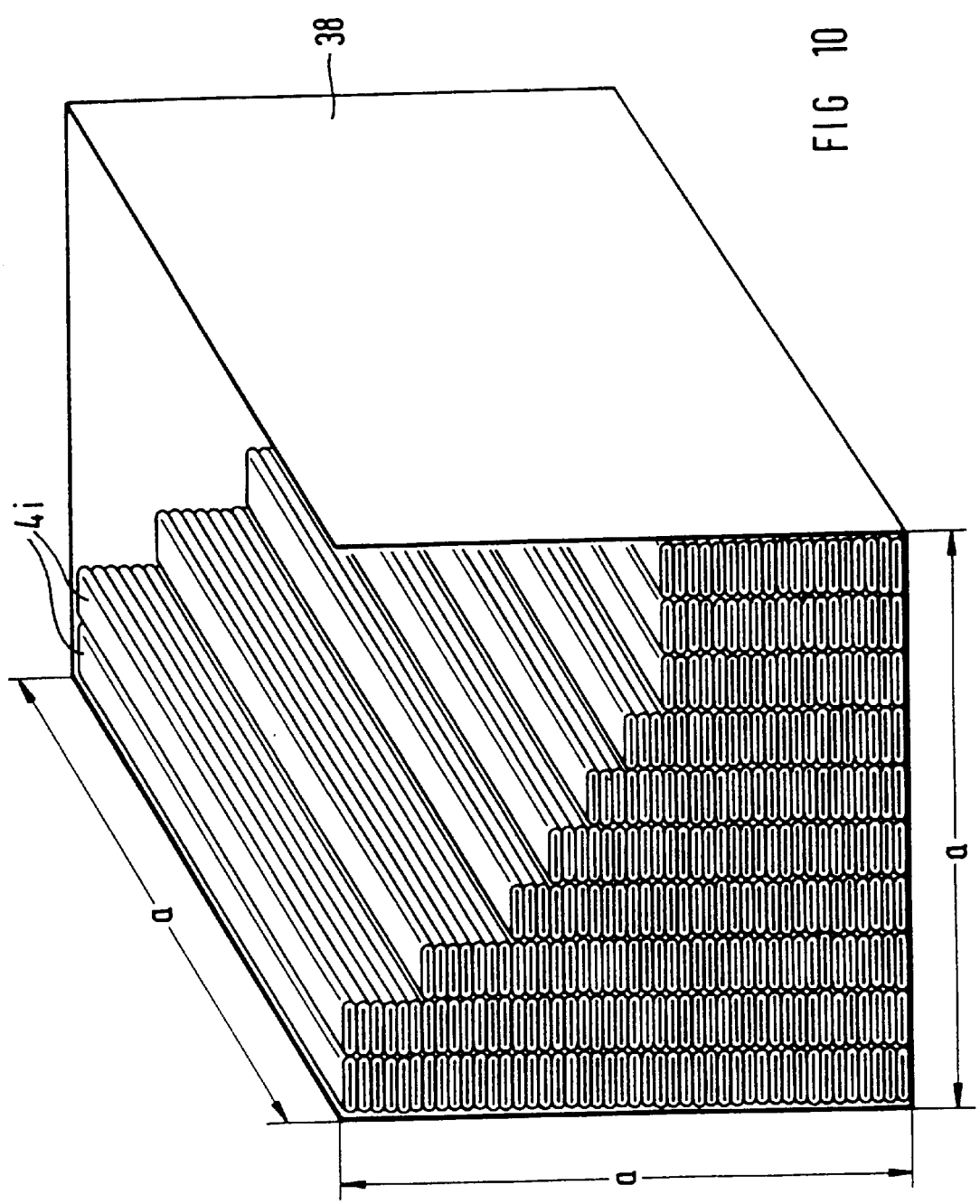

METHOD AND APPARATUS FOR DISPOSING OF A RADIOACTIVELY CONTAMINATED STEAM GENERATOR

CROSS-REFERENCE TO RELATED APPLICATION

This application is a continuation of International Application No. PCT/EP96/04694, filed Oct. 29, 1996, which designated the United States.

BACKGROUND OF THE INVENTION

FIELD OF THE INVENTION

The invention relates to a method and an apparatus for disposing of a radioactively contaminated steam generator which contains a multiplicity of U-shaped bent heating tubes opening into a tube base.

Radioactively contaminated steam generators have been exchanged in the past in a series of nuclear power stations. Such exchange schemes are planned or are in preparation in other nuclear power stations. The shutdown radioactively contaminated steam generators are already in the nuclear power stations and, in order to be disposed of, have to be comminuted so that they can be transported and stored in corresponding casks. Such radioactively contaminated steam generators contain several thousand, for example about 4000, heating tubes bent U-shaped, which likewise have to be dismantled and removed in order to dispose of the entire steam generator. During such disposal measures, it is essentially necessary to avoid subjecting the work personnel to an excessive radiation dose and to avoid spreading the contamination.

It is known from Published European Patent Application 0 555 127 A1 for shutdown radioactively contaminated steam generators to be decontaminated chemically for the purpose of storage, repair or disposal, in order to reduce the radiation dose emanating from them.

SUMMARY OF THE INVENTION

It is accordingly an object of the invention to provide a method and an apparatus for disposing of a radioactively contaminated steam generator, which overcome the hereinafore-mentioned disadvantages of the heretofore-known methods and apparatuses of this general type, which make it possible for a heating tube to have a simple structure, which subject work personnel to as low a dose as possible and which entail the least possible risk of contamination being spread.

With the foregoing and other objects in view there is provided, in accordance with the invention, a method for disposing of a radioactively contaminated steam generator including a casing having a dome with an upper part, a tube base and a multiplicity of U-shaped heating tubes opening into the tube base and having a bend, which comprises severing the heating tubes above the tube base; forming an orifice in the casing by severing and removing the upper part of the dome; force-lockingly retaining or picking-up a heating tube at the tube bend; and drawing the heating tube through the orifice.

Since the steam generator is opened solely in the region of the dome in order to remove the heating tubes, a considerable fraction of the radioactive radiation emanating from the heating tubes is shielded by the casing of the steam generator, so that the personnel are subjected to a considerably reduced dose.

In accordance with another mode of the invention, in order to preform and reduce their tube bend radius, the heating tubes are drawn through a rolling device by using a drawing device and are subsequently introduced into a pressing device in order to be pressed flat. The space required by the removed heating tube outside the steam generator is reduced by bringing together the two legs of a heating tube during rolling and pressing flat, so that the heating tube can be transported and stored in a simple way. This also contributes to reducing the dose to which the personnel are subjected. The volume of the heating tubes is also reduced by pressing them flat. This makes it possible to transport them cost effectively into an ultimate storage location and to store them economically.

In accordance with a further mode of the invention, the drawing device, the rolling device and the pressing device are disposed within the dome. The casing of the steam generator is thereby utilized effectively as a shield during the dismantling operation.

In accordance with an additional mode of the invention, the drawing device is disposed on the pressing device, the drawing device draws the heating tube through the rolling device, with the pressing device being stationary, in a first workstep, and the pressing device is moved relative to the rolling device and draws the heating tube through the rolling device behind, in a second workstep.

In accordance with yet another mode of the invention, the preformed heating tube is introduced into the pressing device by moving the pressing device in the direction of the rolling device and is pressed together by closing the pressing device.

In accordance with yet a further mode of the invention, the closed pressing device, together with the pressed heating tube, is moved away from the rolling device, at the same time draws the heating tube over a predetermined distance through the rolling device, is subsequently, in the opened state, moved once more toward the rolling device, with the heating tube being stationary, and is thereafter closed and moved away once more, so that the heating tube is drawn out of the steam generator in steps and is pressed in stages.

In accordance with yet an added mode of the invention, the pressed-flat heating tube is dismantled into segments of predetermined length. This measure makes it possible for the dismantled heating tubes to be transported in a simple way in small and easily shieldable containers.

In accordance with yet an additional mode of the invention, the pressed-flat part of the heating tube is cut off after the pressing device has been retracted. As a result, the space required during the method as a whole is reduced and additional worksteps which lead to a harmful dose and spread contamination and which would be necessary if the heating tube were dismantled at a later time, are avoided.

With the objects of the invention in view, there is also provided an apparatus for disposing of a radioactively contaminated steam generator including a casing, a tube base and a multiplicity of U-shaped heating tubes opening into the tube base and having a bend with a radius, comprising a severing device for severing a heating tube above the tube base; a retaining or pick-up device for force-lockingly retaining or picking-up the heating tube at the tube bend; a rolling device; a drawing device associated with the rolling device for drawing the heating tube through an orifice in the casing and through the rolling device, for preforming and reducing the tube bend radius; and a pressing device for pressing the preformed heating tube flat.

The apparatus according to the invention allows an essentially automated method cycle. The dose to which the personnel are subjected is thereby minimized.

In accordance with another feature of the invention, there is provided a pressing device which is movable relative to the rolling device and on which a first drawing device is mounted.

In accordance with a concomitant feature of the invention, a cutting device for cutting up the pressed-flat heating tubes is disposed on the pressing device on the side facing away from the rolling device.

Other features which are considered as characteristic for the invention are set forth in the appended claims.

Although the invention is illustrated and described herein as embodied in a method and an apparatus for disposing of a radioactively contaminated steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 10 is a perspective view showing pressed-flat heating tubes in a container, illustrating a packing density according to the invention.

DESCRIPTION OF THE PREFERRED EMBODIMENTS

Figure 1:
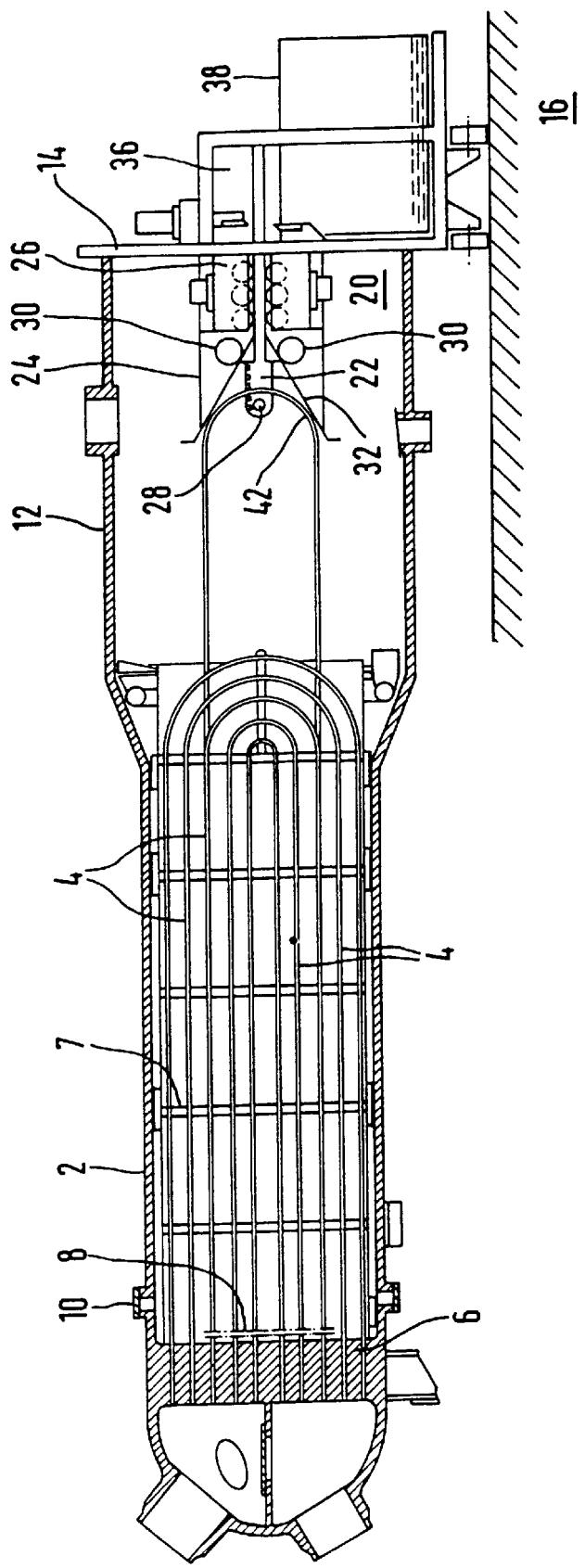
FIG. 1 is a diagrammatic, longitudinal-sectional view of a radioactively contaminated steam generator with an exemplary embodiment of an apparatus according to the invention which is disposed in a working position.

Referring now to the figures of the drawings in detail and first, particularly, to FIG. 1 thereof, there is seen a shutdown, horizontally mounted steam generator 2 which contains about 4000 heating tubes 4 bent U-shaped and having a total length of about 40,000 m. The U-shaped heating tubes 4 have legs with free ends which are rolled into and welded in a tube base 6 and are additionally held by spacer grids 7.

The heating tubes 4 are severed just above the tube base 6 along a parting plane 8, illustrated by dot-dash lines, through the use of an apparatus capable of being introduced through an assembly orifice 10.

An orifice has already been made in a casing of the steam generator 2, in a preceding workstep, by severing and removing an upper part of its dome 12, and an apparatus 20 according to the invention has been introduced into a remaining part of the dome 12. The apparatus 20 is mounted on an assembly plate 14 of a mobile L-shaped stand 16. The assembly plate 14 serves at the same time for shielding the opened steam generator 2.

A drawing device 22, a rolling device 24 and a pressing device 26 are disposed on the assembly plate 14. The drawing device 22 includes a hydraulically interlockable driving key 28 which engages behind a heating tube 4 at the vertex of its bend 42 and which makes a force-locking connection between the drawing device 22 and the heating tube 4. A force-locking connection is one which connects two elements together by force external to the elements, as opposed to a form-locking connection which is provided by the shapes of the elements themselves. The drawing device 22 draws the heating tube 4 through a pair of rollers 30 that are spaced from one another. The pair of rollers reduces the radius of the bend 42 and allows the tube 4 to be introduced into the pressing device 26. In the pressing device 26, after the driving key 28 has been unlocked, the heating tube 4 is pressed flat piece by piece and guided, in the pressed-flat state, through the assembly plate 14 and above the container 38 and is severed by a cutting device 36, so that it falls into the container 38. Guide plates 32 are disposed on the rolling device 24 in order to prevent the heating tube 4 from tilting when it is being introduced into the rolling device 24.

Figure 2:
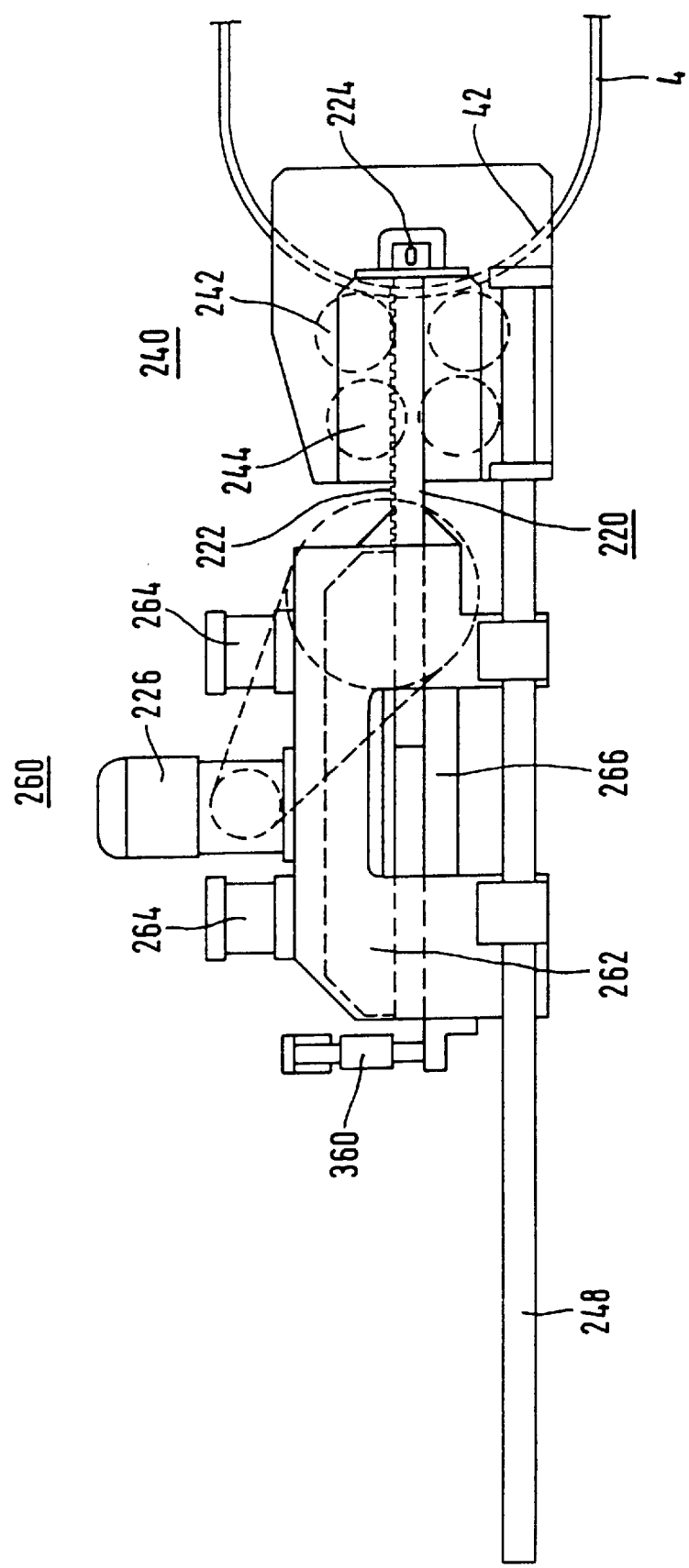
FIGS. 2 to 7 are side-elevational views of a further exemplary embodiment of an apparatus according to the invention, which is illustrated in a different working position in each case.

In an advantageous refinement of the invention according to FIG. 2, a rolling device 240 is provided which contains two pairs of rolling rolls 242 and 244 disposed one behind the other. In this case, the spacing of the rolling rolls of a pair of rolling rolls 242 or 244 decreases in the drawing direction, so that it is possible for the heating tube 4 to be preformed without any kinks. In this case, the spacing of the rolling rolls of a pair of rolling rolls 242 and 244 is at least so large that a driving key 224 hooked on at the vertex of the bend 42 can be guided through the rolling rolls. The rolling rolls preferably have a rolling surface which is curved transversely to the running direction and which is adapted to the radius of the heating tube 4.

The rolling device 240 is fixed to free ends of two guide rods 248 disposed on the assembly plate 14 which cannot be seen in this figure. Again, only one of the two guide rods 248 can be seen in the figure.

A pressing device 260 is mounted displaceably on the guide rods 248 and carries a first drawing device 220. The drawing device 220 includes a rack 222 having a free end which carries the lockable driving key 224. The rack 222 is actuated through a pinion which cannot be seen in the figure and which is driven by an electric motor 226 disposed on the pressing device.

The pressing device 260 includes a press beam 262, represented by dashed lines, which can be pressed against a fixed plate 266 through the use of two hydraulic cylinders 264. A cutting device 360 is disposed at an end of the pressing device 260 which faces away from the rolling device 240. The heating tube 4, which is pressed flat in the pressing device 260, can be sheared off through the use of the cutting device 360.

Figure 3:
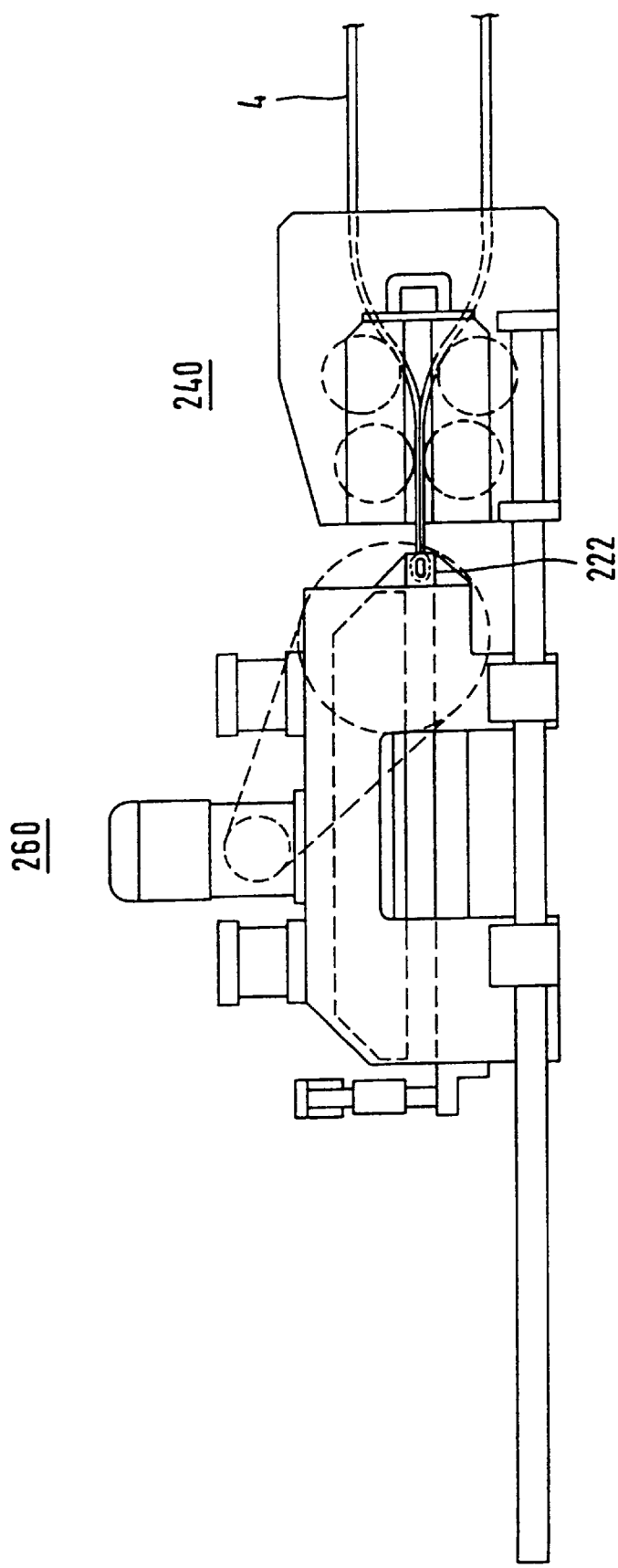

The figure illustrates the apparatus in a working position, in which the not yet deformed heating tube 4 is led up to the first pair of rolling rolls 242 of the rolling device 240. FIG. 3 illustrates a working position, in which the drawing rack or rod 222 has drawn the heating tube 4 through the rolling device 240 as far as the pressing device 260.

Figure 4:
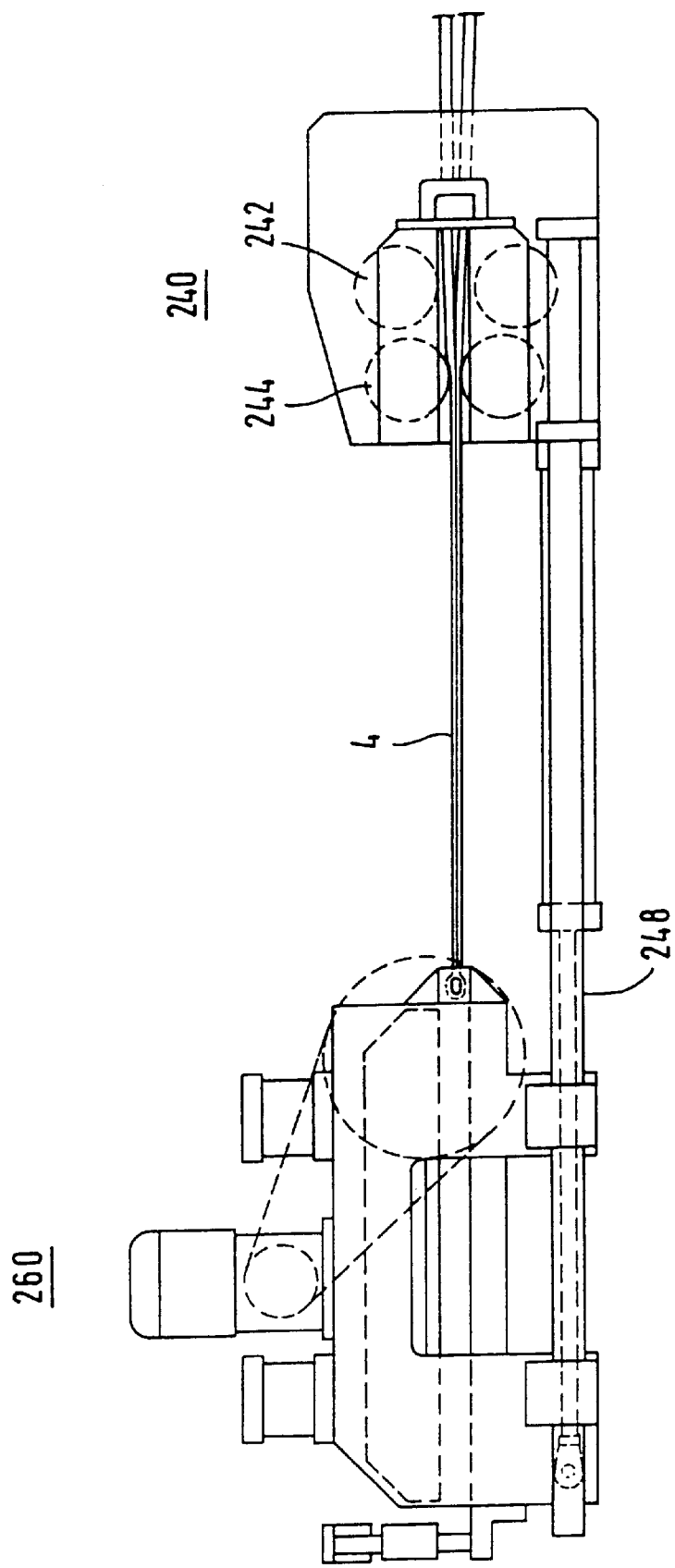
Figure 5:
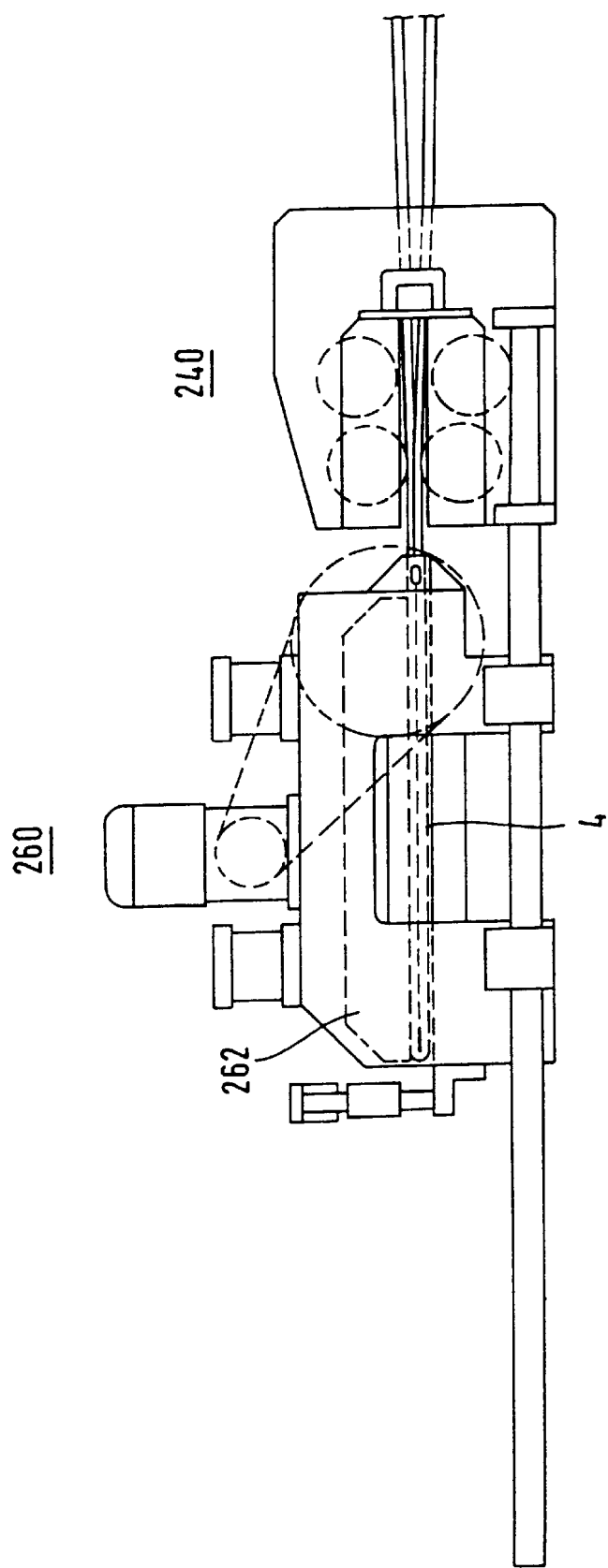

According to FIG. 4, in a subsequent workstep the entire pressing device 260 is moved along the guide rods 248 relative to the rolling device 240, with a drawing rack or rod being locked, so that the heating tube 4 is drawn further through the rolling device 240 and preformed. A preformed tube piece is then located between the pressing device 260 and the rolling device 240. In the preferred tube piece, the two legs of the heating tube 4 are already essentially laid on one another and have an ovalness corresponding to the curvature of the rolling surfaces of the rolling rolls 242 and 244. In a subsequent workstep, the driving key 224 is then uncoupled and, according to FIG. 5, the pressing device 260 is retracted into its initial position relative to the rolling device 240, so that the preformed tube is located within the pressing device 260. The press beam 262 is thereupon actuated hydraulically and the heating tube 4 is pressed flat.

Figure 6:
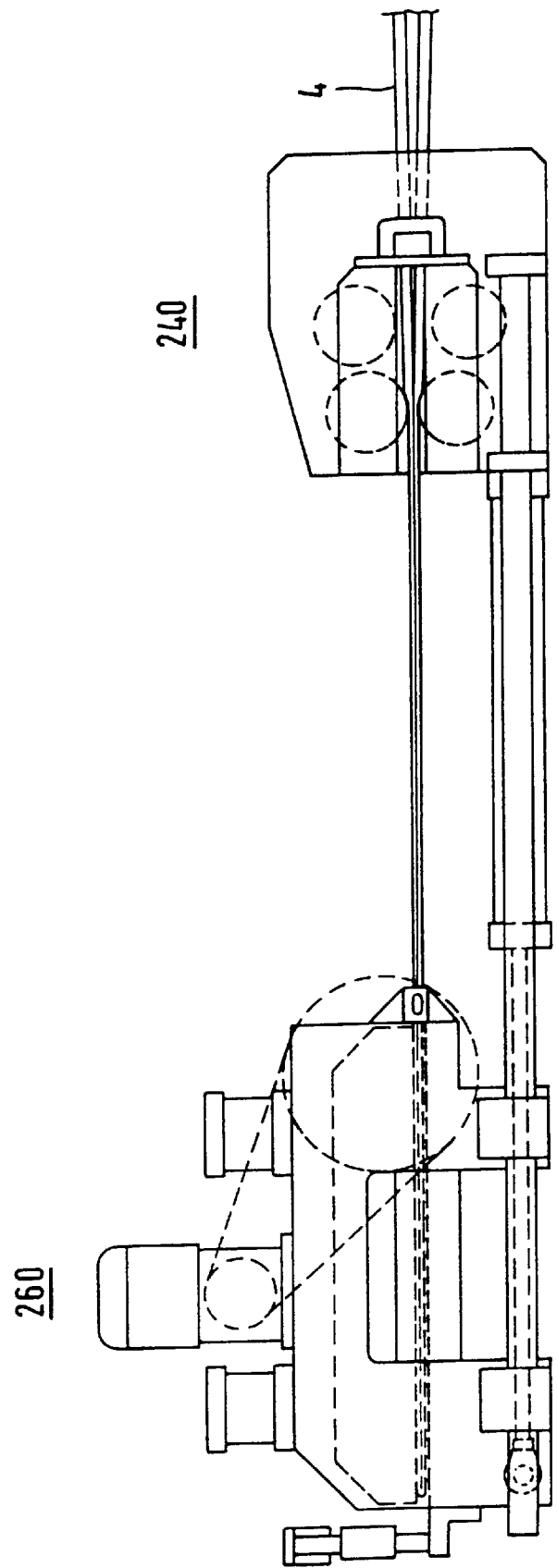

Then, according to FIG. 6, with the press tension being maintained, the pressing device 260 is once more moved away from the rolling device 240 and thereby draws the heating tube 4 further through the rolling device 240 according to the travel of the pressing device 260.

Figure 7:
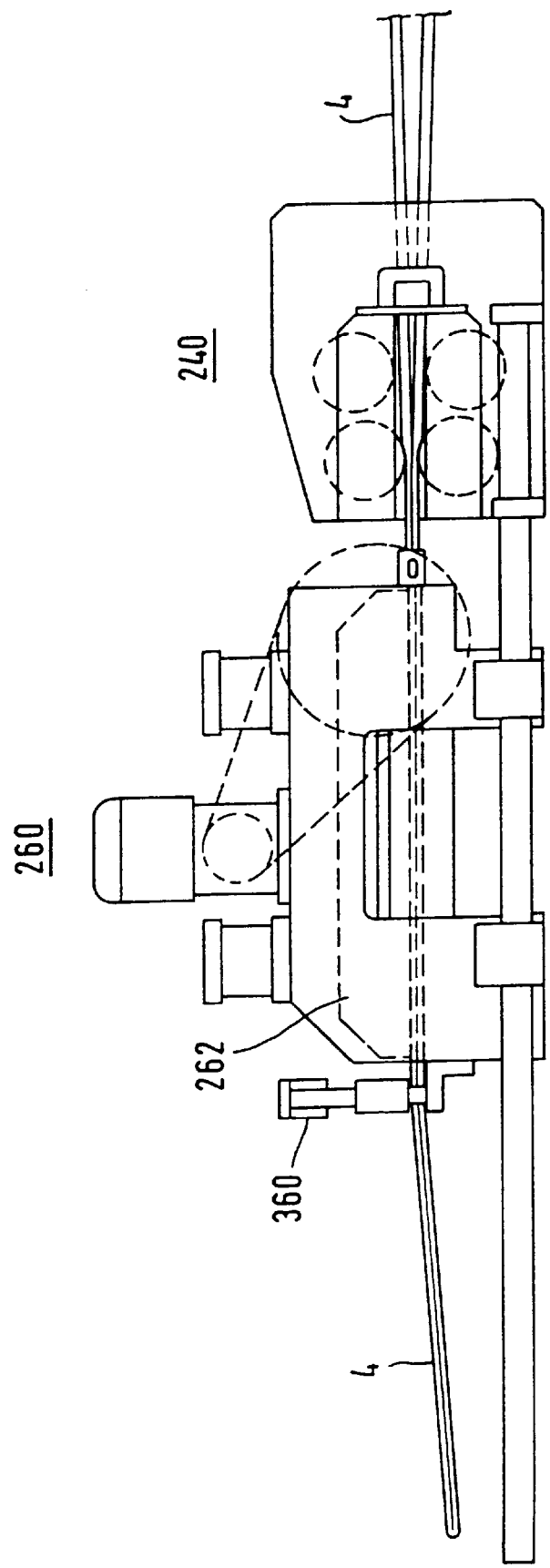

The press beam 262 is retracted, so that the heating tube 4 is released and, according to FIG. 7, the entire pressing device 260 is once more retracted into the initial position at the rolling device 240, so that a preformed, but not yet pressed part of the heating tube 4 is located within the pressing device 260. The pressed-flat part of the heating tube 4 projects at that end of the pressing device 260 which faces away from the rolling device 240. The pressed-flat part can then be sheared off through the use of the cutting device 360 in the initial position.

Figure 8:
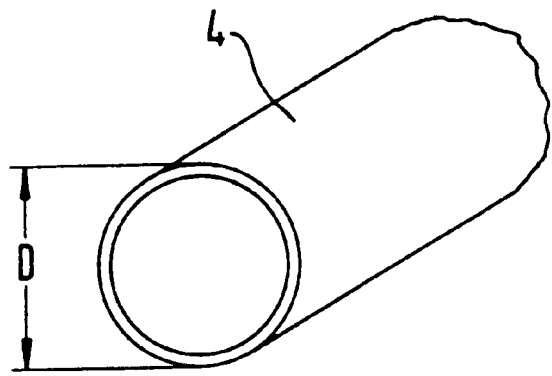
FIGS. 8 and 9 are fragmentary, perspective views of a heating tube before and after it has been pressed flat.
Figure 9:
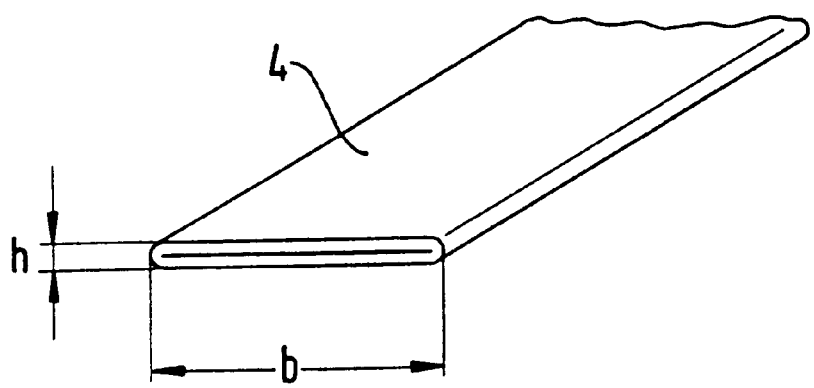

A reduction in volume of the heating tube 4 which accompanies the pressing flat operation can be seen in FIGS. 8 and 9. A round heating tube 4 having an outside diameter $D \approx 22$ mm is pinched to form a flat heating tube 4 of approximately rectangular cross section with a height $h \approx 3$ mm and a width $b \approx 35$ mm. A reduction in volume to one fifth can thereby be achieved. This allows for cost-effective transport to the ultimate nuclear storage location and economical storage.

FIG. 10 illustrates that a cubic container 38 having an edge length $a \approx 1000$ mm can receive virtually 9000 pressed-flat heating tubes cut into segments 4i with a length of 1 m, so that the entire tube bundle of a radioactively contaminated steam generator can be disposed of through the use of four to five containers 38, each having a volume of only 1 m$^3$.

We claim:

1. In a method for disposing of a radioactively contaminated steam generator including a casing having a dome with an upper part, a tube base and a multiplicity of U-shaped heating tubes opening into the tube base and having a bend, the improvement which comprises:

severing the heating tubes above the tube base;

forming an orifice in the casing by severing and removing the upper part of the dome;

force-lockingly retaining a heating tube at the tube bend;

drawing the heating tube through the orifice; and disposing of the heating tubes.

2. The method according to claim 1, which comprises:

drawing the heating tube with a drawing device through a rolling device for preforming the heating tube and reducing a tube bend radius thereof; and introducing the preformed heating tube into a pressing device for pressing the heating tube flat.

3. The method according to claim 2, which comprises providing the drawing device, the rolling device and the pressing device within the dome.

4. The method according to claim 2, which comprises drawing the heating tube out of the steam generator in steps and pressing the heating tube in stages.

5. The method according to claim 2, which comprises:

drawing the heating tube through the rolling device with the drawing device placed on the pressing device, while the pressing device is stationary, in a first workstep; and moving the pressing device relative to the rolling device and drawing the heating tube through the rolling device again, in a second workstep.

6. The method according to claim 5, which comprises introducing the preformed heating tube into the pressing device by moving the pressing device in the direction of the rolling device and pressing the heating tube together by closing the pressing device.

7. The method according to claim 6, which comprises:

moving the closed pressing device together with the pressed heating tube away from the rolling device and simultaneously drawing the heating tube over a predetermined distance through the rolling device with the pressing device;

subsequently opening the pressing device;

moving the pressing device in the opened state once more toward the rolling device with the heating tube being stationary; and then closing and moving the pressing device once more, for drawing the heating tube out of the steam generator in steps and pressing the heating tube in stages.

8. The method according to claim 2, which comprises dismantling the pressed-flat heating tube into segments of predetermined length.

9. The method according to claim 7, which comprises dismantling the pressed-flat heating tube into segments of predetermined length, and cutting off the pressed-flat part of the heating tube after the pressing device has been retracted.

* * * * *

UNITED STATES PATENT AND TRADEMARK OFFICE
CERTIFICATE OF CORRECTION

PATENT NO : 6,041,484
DATED : March 28, 2000
INVENTOR(S) : Rainer Kunz et al.

It is certified that error appears in the above-identified patent and that said Letters Patent is hereby corrected as shown below:

On the title page: Item

Item [30] should read as follows:

Nov 7, 1995     [DE]   Germany.......... 195 41 501.9

Signed and Sealed this

Twentieth Day of February, 2001

Attest:

NICHOLAS P. GODICI

Attesting Officer     Acting Director of the United States Patent and Trademark Office